US010323518B2

(12) United States Patent
Matsuda et al.

(10) Patent No.: US 10,323,518 B2
(45) Date of Patent: Jun. 18, 2019

(54) TURBOCHARGER IMPELLER, METHOD OF MANUFACTURING THE SAME, TURBOCHARGER, AND TURBOCHARGER UNIT

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Masaaki Matsuda, Kariya (JP); Yoshio Taneda, Kariya (JP); Shuichi Hirota, Kariya (JP); Hidetoshi Harima, Kariya (JP); Nobuhiko Inoue, Kariya (JP); Koichi Yonezawa, Toyota (JP); Takashi Tsukiyama, Toyota (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 655 days.

(21) Appl. No.: 14/761,969

(22) PCT Filed: Jan. 22, 2014

(86) PCT No.: PCT/JP2014/051243
§ 371 (c)(1),
(2) Date: Jul. 20, 2015

(87) PCT Pub. No.: WO2014/115761
PCT Pub. Date: Jul. 31, 2014

(65) Prior Publication Data
US 2015/0354359 A1    Dec. 10, 2015

(30) Foreign Application Priority Data

Jan. 23, 2013   (JP) ................. 2013-009996

(51) Int. Cl.
*B63H 1/16*  (2006.01)
*B64C 11/22*  (2006.01)
(Continued)

(52) U.S. Cl.
CPC ............... *F01D 5/02* (2013.01); *B23P 15/00* (2013.01); *F02B 39/00* (2013.01); *F04D 25/024* (2013.01);
(Continued)

(58) Field of Classification Search
CPC ...................... F04C 18/0291; F04C 18/0215; F04C 19/005; F01D 5/02
(Continued)

(56) References Cited

U.S. PATENT DOCUMENTS 1,531,967 A  *  3/1925  MacMillan ............. B63H 1/20
                                                416/236 R
1,864,803 A  *  6/1932  Clark ....................... B63H 1/26
                                                159/4.2
(Continued)

FOREIGN PATENT DOCUMENTS

DE           833100 C      3/1952
DE      102008024115 A1    11/2009
(Continued)

OTHER PUBLICATIONS

Communication dated Sep. 2, 2016, issued by the European Patent Office in corresponding European Application No. 14743296.7.

*Primary Examiner* — Deming Wan
(74) *Attorney, Agent, or Firm* — Sughrue Mion, PLLC (57) ABSTRACT

A turbocharger impeller is provided with a hub portion with a plurality of vane portions extending outwardly thereof. The hub portion is substantially shaped as a truncated cone with a diameter that gradually increases along a rotation axis. The vane portions are formed on a surface of the hub (Continued)

portion and guide a fluid flowing along the rotation axis radially outward relative to the hub portion. Grooves are formed in and/or on surfaces of the vane portions along a direction of the fluid flowing radially outward during rotation of the impeller. Protruding crest portions are formed between adjacent grooves. Crest portions in a central region near the rotation axis are lower in height than crest portions in an outer region further away from the rotation axis.

14 Claims, 10 Drawing Sheets

(51) Int. Cl.
| | | |
|---|---|---|
| *B64C 27/467* | (2006.01) | |
| *F03B 3/12* | (2006.01) | |
| *F04D 29/38* | (2006.01) | |
| *F04D 29/44* | (2006.01) | |
| *F04D 29/22* | (2006.01) | |
| *F01D 9/02* | (2006.01) | |
| *F01D 5/02* | (2006.01) | |
| *B23P 15/00* | (2006.01) | |
| *F02B 39/00* | (2006.01) | |
| *F04D 29/30* | (2006.01) | |
| *F04D 25/02* | (2006.01) | |
| *F04D 29/28* | (2006.01) | |
| *F04D 29/68* | (2006.01) | |
| *F02B 37/24* | (2006.01) | |
| *B23C 3/18* | (2006.01) | |

(52) U.S. Cl.
CPC ............ *F04D 29/284* (2013.01); *F04D 29/30* (2013.01); *F04D 29/681* (2013.01); *B23C 3/18* (2013.01); *F02B 37/24* (2013.01); *Y10T 29/49323* (2015.01)

(58) Field of Classification Search
USPC ....... 416/236 R, 236 A, 183, 185; 415/208.1
See application file for complete search history.

(56) References Cited

U.S. PATENT DOCUMENTS

| | | | | |
|---|---|---|---|---|
| 3,033,293 | A * | 5/1962 | Bihlmire | B63H 1/14 416/236 R |
| 3,481,531 | A * | 12/1969 | MacArthur | F04D 29/284 415/914 |
| 4,720,239 | A * | 1/1988 | Owczarek | F01D 5/141 415/119 |
| 4,859,150 | A * | 8/1989 | Takigawa | F04D 29/681 415/119 |
| 4,869,644 | A * | 9/1989 | Takigawa | F04D 29/661 415/119 |
| 4,930,729 | A * | 6/1990 | Savill | B63B 1/34 138/37 |
| 5,846,055 | A | 12/1998 | Brodersen et al. | |
| 6,280,144 | B1 * | 8/2001 | Powers | F04D 29/388 416/228 |
| 8,721,280 | B2 * | 5/2014 | Nakagawa | F04D 29/164 415/222 |
| 2007/0134086 | A1 | 6/2007 | Higashimori et al. | |

FOREIGN PATENT DOCUMENTS

| | | |
|---|---|---|
| EP | 0629779 A1 | 12/1994 |
| JP | 57-202800 U | 12/1982 |
| JP | 166500 U | 4/1989 |
| JP | 9-100797 A | 4/1997 |
| JP | 2002-36020 A | 2/2002 |
| JP | 2003-120574 A | 4/2003 |
| JP | 2005-163640 A | 6/2005 |
| JP | 2008223760 A | 9/2008 |

\* cited by examiner

TURBOCHARGER IMPELLER, METHOD OF MANUFACTURING THE SAME, TURBOCHARGER, AND TURBOCHARGER UNIT

CROSS-REFERENCE TO RELATED APPLICATIONS

The present application is a National Phase entry of, and claims priority to, PCT Application No. PCT/JP2014/051243, filed Jan. 22, 2014, which claims priority to Japanese Patent Application No. 2013-009996, filed Jan. 23, 2013, both of which are incorporated herein in their entireties by reference.

BACKGROUND

The present invention relates to a turbocharger impeller, a method of manufacturing the same, a turbocharger, and a turbocharger unit.

A turbocharger is used, for example, for an internal combustion engine mounted in a vehicle. The turbocharger recovers energy of an exhaust gas of the internal combustion engine through a turbine. The recovered energy rotates an impeller (compressor) connected to the turbine via a shaft. The impeller rotates, and the internal combustion engine is supercharged with intake air. As a result, the intake efficiency is enhanced, and the internal combustion engine is improved in terms of output and of fuel efficiency.

The turbine, or impeller, may include a substantially truncated cone-shaped hub portion, and a plurality of vane portions, formed on a surface of the hub portion, that extend outward from a periphery thereof. The vane portions force-feed a fluid (i.e. intake air) in the radially outward direction relative to the surface of the hub portion. Further, the vane portions, described above, may be precisely positioned and/or configured within the turbocharger as a whole to achieve a desired improvement in engine intake efficiency. Accordingly, the impeller may be produced via precision investment casting. However, precision investment casting often requires a relatively long operation and/or production cycle time to complete, relative to other forms of casting, for example. Thus, a method to manufacture impellers with a short operation time is desired.

However, instead of producing the impeller via precision investment casting, alternative methods, such as machining a base material such as an extruded material, may be employed. Machining, however, may create various undesirable grooves due to the machining on the surfaces of the vane portions and/or the hub portion. Such a groove may create and/or increase turbulence experienced by a fluid flowing across an impeller. As a result, an impeller made by machining may actually diminish engine intake efficiency due to turbulence caused by grooves and/or other imperfections in the impeller, in comparison an impeller formed by precision investment casting.

To address the issues presented above, post-production surface processing of the vane portions and the hub portion may be performed to eliminate the grooves. However, such surface processing may require an even longer period of time to complete, compared with the conventional precision investment casting, thus the method may not desirable for efficient high-volume impeller production. Currently, there may be a need for an impeller able to maintain pressure loss within a desirable, i.e. an optimal range, such as that associated with an impeller produced by precision investment casting while leaving grooves. Because of leaving the grooves, the impeller can be machined from the base material in a shorter time. By providing a construction helping to suppress pressure loss, it is possible to realize an intake efficiency equivalent to that of the impeller produced by precision investment casting.

Japanese Laid-Open Patent Publication No. 2005-163640 (referred to as publication 640) generally discloses an impeller of a compressor. The impeller includes a hub portion and vane portions that extend outwardly thereof. Grooves extend linearly across wing surfaces of the vane portions. The groove prevent enlargement of a boundary layer (a boundary layer of a fluid flow) generated on a surface of the hub portion or separation of the flow. As a result, the efficiency of the compressor is enhanced.

Japanese Laid-Open Patent Publication No. H09-100797 (referred to as publication 797) discloses a vane wheel (i.e. corresponding to an impeller) of a centrifugal compressor. The vane wheel includes a hub portion and vane portions that extend outwardly thereof. In the vane portions, grooves are formed to extend from fluid inlet portions to intermediate positions. Each groove may be formed with a predetermined groove width, interval, and depth to conform to a fluid flowing direction as directed by the vane portions during rotation of the vane wheel.

Japanese Laid-Open Patent Publication No. 2003-120574 (referred to as publication 574) discloses a vane wheel (i.e. corresponding to an impeller) of a motor pump. The vane wheel includes a hub portion and vane portions that extend outwardly thereof. Grooves are formed to extend in a rotational direction on a surface of the vane portions. In detail, the grooves may be formed such that an outer peripheral region and an inner peripheral region of the vane wheel accommodate equivalent fluid feeding amounts. In the inner peripheral region, the space between separating each of the grooves is set to be large. In the outer peripheral region, the space between separating each of the grooves is set to be small.

When machining an impeller from a base material, a groove remains on the surface of the impeller portion due to the machining. The groove may direct and/or guide fluid flow. Such grooves are need for allowing the impeller to suppress pressure loss to achieve intake efficiency equivalent to that of an impeller formed by precision investment casting. In comparison, the above-discussed publication 640, publication 797, and publication 574 may not disclose a method of machining the impeller from a base material.

Publication 640 discloses grooves formed in the hub portion. Publication 797 discloses grooves formed in the vane portions. However, both sets of grooves, in publication 640 and publication 797, are formed in order to prevent enlargement of a boundary layer of a fluid at a central portion of the impeller and/or undesirable separation of fluid flow. Thus, these grooves may not be formed to suppress pressure loss at an inlet portion.

Moreover, the grooves described in publication 640, publication 797, and publication 574 are formed in a process subsequent to impeller fabrication. For example, after manufacturing the impeller by conventional production methods, grooves are then formed in the impeller by a separate process. Thus, these methods do not help to produce the impeller in a shorter time.

Specifically, as disclosed by publication 640, the hub portion includes a groove, whereas there no grooves are present in the vane portions. In a technique disclosed by publication 797, the vane portions include grooves. The grooves disclosed by publication 797, however, are formed at equal intervals and with a predetermined depth in the impeller. Such grooves are formed only at the fluid inlet portions of the vane portions and extend to regions that correspond to intermediate positions of the vane portions. As discussed in publication 574, grooves are formed in the vane portions. The space between separating each of the grooves is smaller in the outer peripheral region than in the inner peripheral region. As a result, similar and/or identical amounts of fluid may be easily and/or uniformly dispersed about the outer peripheral region at the rear of the vane portions as the inner peripheral region of the vane portions. The grooves, however, are of equal depth.

There is a need in the art for an impeller of a turbocharger that provides highintake efficiency and may be manufactured by an efficient and/or relatively inexpensive process.

BRIEF SUMMARY OF THE DISCLOSURE

In an embodiment, a turbocharger impeller includes a hub portion and a plurality of vane portions that extend outwardly from a surface and/or periphery thereof. The hub portion is shaped substantially as a truncated-cone formed with a gradually increasing diameter along a rotational axis direction. The vane portions are formed on a surface and/or periphery of the hub portion and force-feed in the radially outward direction a fluid having flowed in from the rotation axis direction. Grooves are formed on surfaces of the vane portions. The grooves are formed on the vane portions to extend along a direction of redirected fluid flow during impeller operation; i.e. where fluid flowing in the rotation axis direction is guided and/or redirected radially outward relative to the hub portion during rotation of the impeller. Crest portions protruding from the grooves are formed between adjacent grooves. In detail, crest portions located in a central region close to the rotation axis are higher in height than corresponding crest portions in an outer region further away from the rotation axis.

Thus, the impeller may be machined from a base material such that each groove may be formed in a desired direction, depth and/or height. As a result, it is possible to suppress pressure loss of the fluid that the impeller transfers (force-feeds).

In another embodiment, the distance between each groove in the outer region of the vane portions may be smaller than the distance between each groove in the central region. This configuration may further suppress undesirable pressure loss of the fluid transferred by the impeller.

In a still further embodiment a method for manufacturing a turbocharger impeller is disclosed. In the manufacturing method, vane portions may be machined from a base material by moving a machining tool along a rotation axis of the impeller and/or outward in the radial direction. The vane portions are machined so that grooves are formed on surfaces of the vane portions by the machining tool. Such grooves are formed sequentially such that edges of adjacent grooves are face each other. In detail, the grooves are formed such that crest portions between the grooves in an outer region are lower than crest portions between the grooves in a central region. As a result, the pressure loss of the fluid transferred by the impeller is further suppressed, and the impeller can be machined in a shorter amount of time.

In an embodiment, the turbocharger has a compressor with a housing designed to accommodate the impeller. The compressor has a fluid inflow port and a fluid swirl-regulating portion located near the fluid inflow port. The fluid swirl-regulating portion extends inwardly, in the radial direction, from an inner surface of the compressor. In detail, the fluid swirl-regulating portion is in the form of a rib that extends along a rotation axis of the impeller. During impeller rotation and/or operation, the fluid swirl-regulating portion may guide, direct and/or regulate swirling of the fluid along an inner surface of the compressor.

In an alternative arrangement to the above-described configuration, the fluid swirl-regulating portion may extend in a radial direction to connect opposing portions of an inner surface of an inflow inlet of the compressor. In detail, the fluid swirl-regulating portion may have a plate that extends in a direction toward a rotation axis of the impeller. Further, the fluid swirl-regulating portion may be formed integrally with the inner surface of the compressor (i.e. as one unit), or may be formed separate from the inner surface to attach to the inner surface. The fluid swirl-regulating portion may suppress the pressure loss of the fluid transferred (force-fed) during impeller rotation and/or operation. Thus, the fluid swirl-regulating portion may work in conjunction with the grooves formed in the impeller to suppress the pressure loss of the fluid across the impeller.

In another embodiment, a turbo unit has a compressor and an inlet elbow in fluid communication thereof. Similar to that described for other embodiments, the compressor has a housing designed to accommodate the impeller. The inlet elbow connects to the compressor and guides fluid to flow in the compressor from a rotation axis direction of the impeller. The inlet elbow has a discharge port for the fluid and a fluid swirl-regulating portion formed in a vicinity of the discharge port. In detail, the fluid swirl-regulating portion may extend in a radially inward direction from an inner surface of the inlet elbow. Also, the fluid swirl-regulating portion may be formed as a rib extending, in a longitudinal direction, along the inner surface of the inlet elbow. In such an arrangement, the fluid swirl-regulating portion may regulate and/or direct flow, such as swirling of the fluid, along the inner surface of the inlet elbow.

As an alternative to the configuration described above, the fluid swirl-regulating portion may extend in the radial direction across a center of a cross-section of the inlet elbow to bridge between portions of the inner surface of the discharge port of the inlet elbow. Further, the fluid swirl-regulating portion may have a plate extending in the longitudinal direction of the inlet elbow. Also, the fluid swirl-regulating portion may be integral with the inner surface of the inlet elbow, or may be formed as a member separate from the inner surface that may connect to the inner surface of the inlet elbow as needed. Thus, the fluid swirl-regulating portion may suppress, for example, excessive and/or undesirable, the pressure loss of the fluid transferred (force-fed). Thus, the fluid-swirl-regulating portion may work in conjunction with grooves formed in the impeller to suppress pressure loss.

DETAILED DESCRIPTION OF THE PRESENTLY PREFERRED EMBODIMENTS

A turbocharger 1 will be described with reference to FIG. 1. The turbocharger 1 may be configured to attach to and/or coupled with an internal combustion engine mounted, for example, in a vehicle such as an automobile. The turbocharger 1 has three housings: an exhaust housing 10, an intake housing 20 and a bearing housing 30. Bearings (not shown in the FIGS.) support a shaft 31 to allow the shaft 31 to rotate freely about a rotation axis (herein referred to as "ZC" in at least FIG. 1) within the bearing housing 30. A turbine 40 is provided inside the exhaust housing 10. Also, an impeller 50 (i.e. a turbocharger impeller) is provided inside the intake housing 20.

The shaft 31 has a first end in the exhaust housing 10, and a second end, opposing the first end, in the intake housing 20. The turbine 40 may be attached to and/or connected with on the first end. The impeller 50 may be attached to and/or connected with on the second end. Turbine 40 and the impeller 50 are connected to each other by the shaft 31. As a result of this configuration, the turbine 40, the shaft 31 and the impeller 50 may rotate integrally about the rotation axis ZC.

Figure 1:
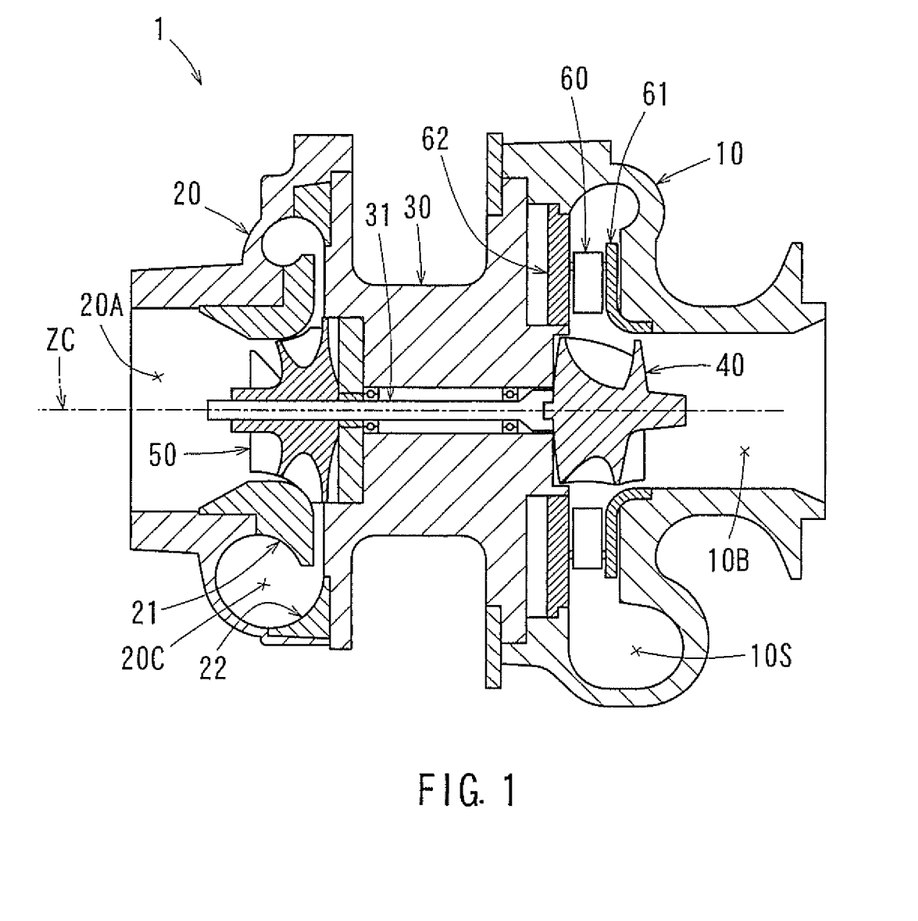
FIG. 1 is a cross-sectional view (taken in an axial direction) of a turbocharger in accordance with an embodiment of the present invention.

The exhaust housing 10 has an exhaust inflow port 10A (shown in FIG. 6), a scroll chamber 10S (shown in FIG. 1), and an exhaust discharge port 10B (also shown in FIG. 1). Exhaust gas produced by the internal combustion engine enters into the exhaust inflow port 10A. Exhaust gas flowing toward the turbine 40 is guided into the scroll chamber 10S. The exhaust gas is used for energy recovery at the turbine 40 and may exit through the exhaust discharge port 10B. Variable valves 60 and VN plates 61 and 62 are provided within the exhaust housing 10. The variable valves 60 may adjust the velocity (i.e. increase and/or decrease, etc.) of the exhaust gas flowing from the scroll chamber 10S toward the turbine 40. The VN plates 61 and 62 support the variable valves 60. A detailed illustration and description of a drive mechanism driving the variable valves 60 will be left out.

Figure 6:
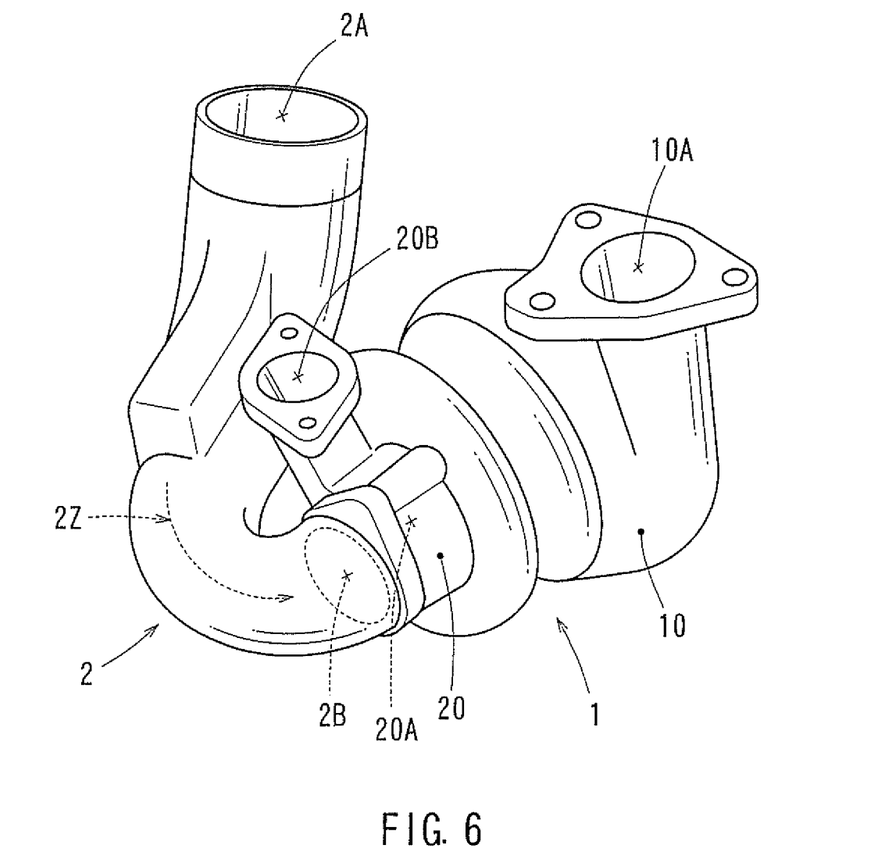
FIG. 6 is a perspective view of a turbo unit where an inlet elbow is incorporated into the turbocharger in accordance with an embodiment of the present invention.

The intake housing 20 includes an intake inflow port 20A, a scroll chamber 20C, and an intake discharge port (indicated by numeral 20B in FIG. 6). The intake gas (air) sucked into the internal combustion engine flows in from the intake inflow port 20A. The air transferred (force-fed) by the impeller 50 passes the scroll chamber 20C constituting a path. The transferred air is discharged from the intake discharge port. A shroud member 21 and a scroll member 22 that defines the scroll chamber 20C are located in the intake housing 20.

Figure 2:
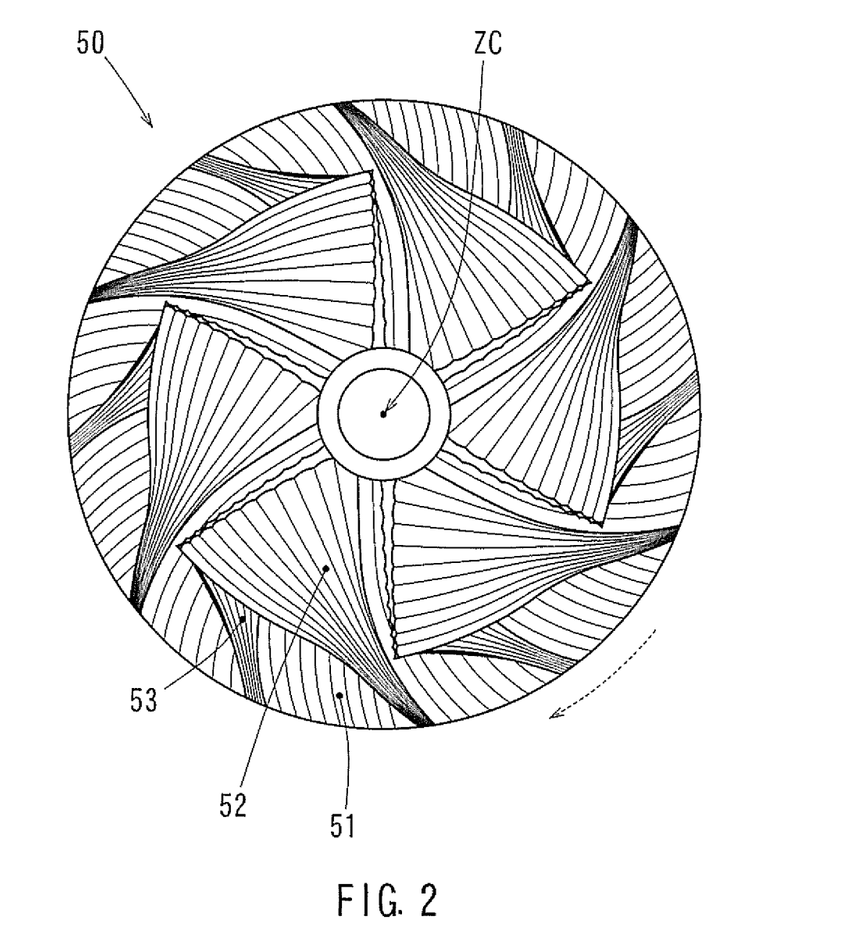
FIG. 2 is a plan view of an impeller of the turbocharger in accordance with an embodiment of the present invention.
Figure 3:
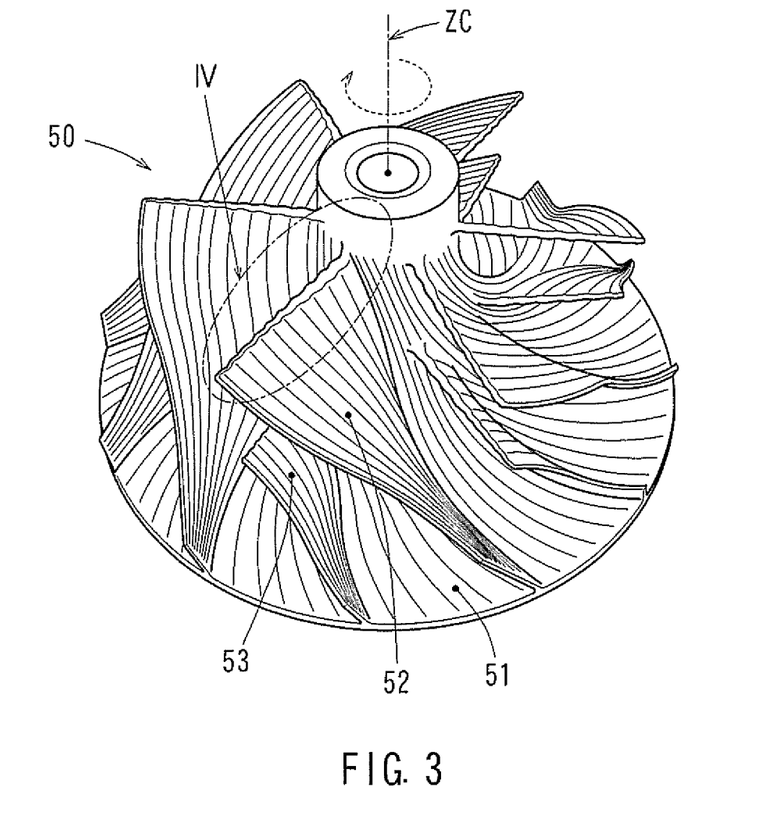
FIG. 3 is a perspective view of the impeller in accordance with an embodiment of the present invention.

The impeller 50 supercharges the internal combustion engine by using the rotational power of the turbine 40. The precision in the configuration of the impeller 50 greatly affects the intake efficiency. As shown in FIGS. 2 and 3, the impeller 50 has a hub portion 51 and a plurality of vane portions 52 and 53. The hub portion may be substantially shaped as a truncated cone. The vane portions 52 and 53 are formed on and extend outwardly from the surface of the hub portion 51, and thus may guide (force-feeds) a fluid, i.e. air, flowing into the intake inflow port 20A along the rotation axis ZC to a direction radially outward. The precision in configuration of the vane portions 52 and 53 may greatly affect, in particular, the intake efficiency of the turbocharger 1.

Conventionally, impellers may be manufactured via precision investment casting, an involved process that may require a relatively long time to complete. As a result, there has been a need in the art for a method to manufacture an impeller in a relatively shorter amount of time. Instead of precision investment casting, an impeller may be manufactured via machining (so-called shaving) a base material. In that method, however, grooves are left on the surface of the impeller. Such grooves may negatively affect flow of a fluid, and may increase pressure loss. Thus, the grooves may reduce the intake efficiency. Surface processing may be added on the method in order to eliminate the grooves. However, that method requires a long manufacturing time, so that it is not desirable. Nevertheless, leaving grooves during machining the base material may be desirable, because the grooves may suppress the pressure loss. This may reduce the machining time and further suppress the pressure loss.

Figure 4:
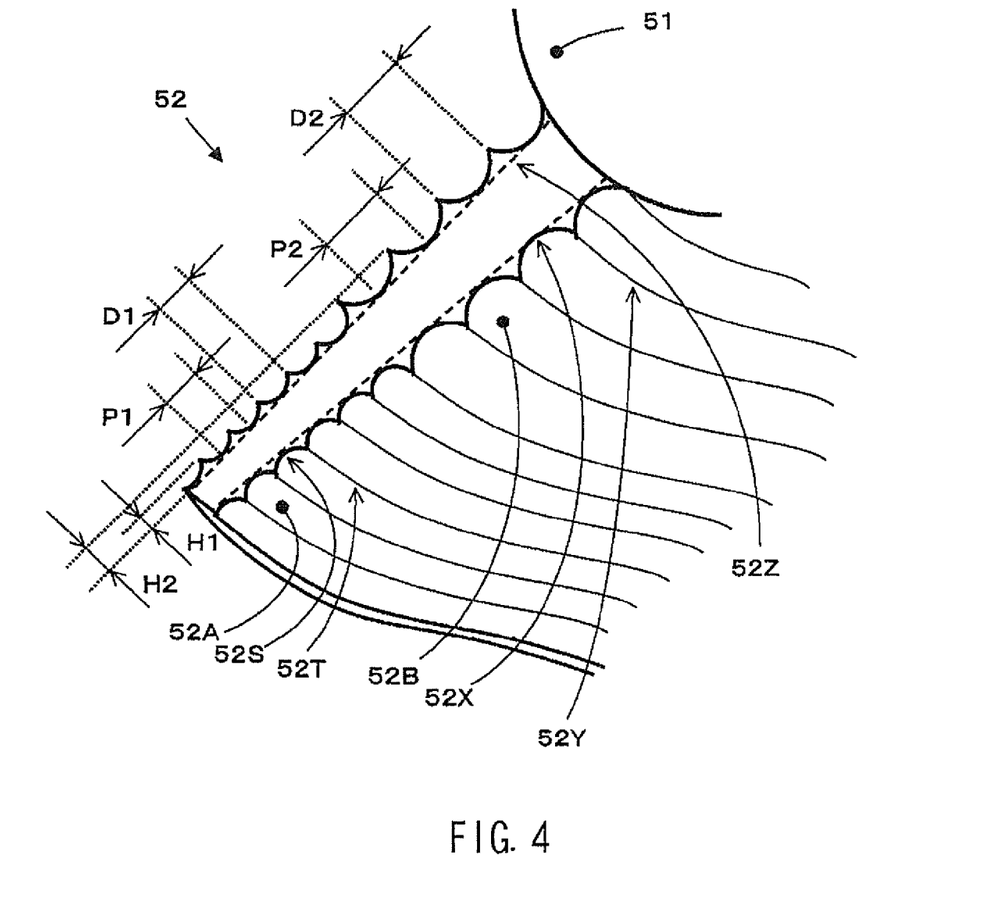
FIG. 4 is an enlarged view of a portion of FIG. 3 for illustrating grooves of vane portions in accordance with an embodiment of the present invention.

The impeller 50 will be described with reference to FIGS. 2 through 5. As shown in FIGS. 2 through 4, the impeller 50 includes the hub portion 51 and vane portions 52 and 53. The hub portion 51 is shaped as a substantially truncated cone, which gradually increases in diameter along the rotation axis ZC of the turbocharger as shown in FIG. 1. The vane portions 52 and 53 are formed on the surface of the hub portion 51, and may force-feed fluid following along the rotation axis ZC in the radially outward direction. Grooves, for example the grooves 52A and 52B in FIG. 4, are formed on the surfaces of the hub portion 51 and the vane portions 52 and 53.

A machining tool T may be used to machine a base material, i.e. via contacting a tip end portion of the machining tool T with the base material. The base material is machined by moving the machining tool T, and the grooves are formed as the movement paths of the machining tool T. For example, certain types of machining tools may be used, such as a tapered ball end mill to produce, for example, groove patterns shapes as a plurality of dot groups. For example, the impeller may be machined from the base material by an initial rough-machining step, a medium-machining step, and a finish-machining step performed sequentially in the order listed. A tapered ball mill may be used to machine the base material in the finish-machining step.

It is to be assumed that the directions of the grooves 52A and 52B and heights H1 and H2 shown in FIG. 4 affect the pressure loss. The directions of the grooves 52A and 52B are the longitudinal directions of the grooves 52A and 52B. The heights H1 and H2 are the heights of crest portions 52T and 52Y formed at the edge of the grooves. The grooves 52A and/or 52B are formed in the surfaces of the vane portions 52 and 53.

The grooves 52A and/or 52B are formed to direct the fluid radially outward in order to suppress the pressure loss. As a result, the fluid may flow in from along the rotation axis ZC direction when the impeller 50 rotates, and may flow in the radially outward direction. As generally shown in at least FIG. 1, the grooves 52A and/or 52B may extend from the intake inflow port 20A toward the scroll chamber 20C. The grooves may or may not be in the configuration as shown in FIG. 3. For example, at least a portion of the grooves may be formed to extend from intake inlet port 20A toward the shroud member 21. This helps to attain a desirable effect. The grooves 52A and/or 52B are also formed on the surface of the hub portion 51. These grooves may be also formed to cause the fluid in the radially outward direction.

As shown in FIG. 4, the cross section orthogonal to the longitudinal direction of the grooves 52A and 52B are of an arc-shaped. However, the depending on the machining condition, the grooves may not be arc-shaped. The grooves adjacent to each other overlap each other at the edges extending in the longitudinal direction. Crest portions 52T and 52Y are formed along the longitudinal direction of the grooves at the locations where the edges overlap each other. The crest portions 52T and 52Y protrude from the surfaces of the vane portions 52 and/or 53.

The dotted lines in FIG. 4 indicate an imaginary surface 52Z obtained by machining the crest portions 52T and 52Y to flatten surfaces of the vane portions 52 and/or 53. The crest portions 52T and 52Y may have heights H1 and H2 as measured from the imaginary surface 52A or trough portions 52S and 52X. The height H2 of the high crest portions 52Y is, for example, 0.1 μm. The height H1 of the low crest portions 52T is, for example, 0.05 μm. The path pitches P1 and P2 of the grooves 52A and 52B are enlarged to reduce the number of grooves 52A and 52B. This makes it possible to further reduce the amount of time to machine. The path pitches P1 and P2, as shown in FIG. 4, may correspond to gap between the grooves 52A and/or 52B. The path pitches P1 and P2 are substantially the same distance as defined by the intervals D1 and D2 of the crest portions as shown in FIG. 4. However, should the path pitches P1 and P2 of the grooves be increased, the heights H1 and H2 of the crest portions 52T and 52Y are further proportionately increased. Thus, pressure loss may increase due to the increased heights of the crest portions.

The vane portions 52 and 53 have a central region, close to the rotation axis ZC, and an outer region, further away from the rotation axis ZC. The central region is of a lower rotational speed than the outer region. Thus, it is to be assumed that, in the central region, the pressure loss due to the height of the crest portions is smaller than in the outer region. The path pitch P1 of grooves in the outer region is set to be smaller than the path pitch P2 of grooves in the central region. The height H1 of the crest portions 52T in the outer region is set to be lower than the height H2 of the crest portions 52Y in the central region. Thus, pressure loss of a fluid may be effectively suppressed. In the case where the base material is machined to leave the above-mentioned grooves, the impeller 50 can be produced in several minutes, which may be a shorter amount of time to produce the impeller than an impeller produced by precision investment casting.

Figure 5:
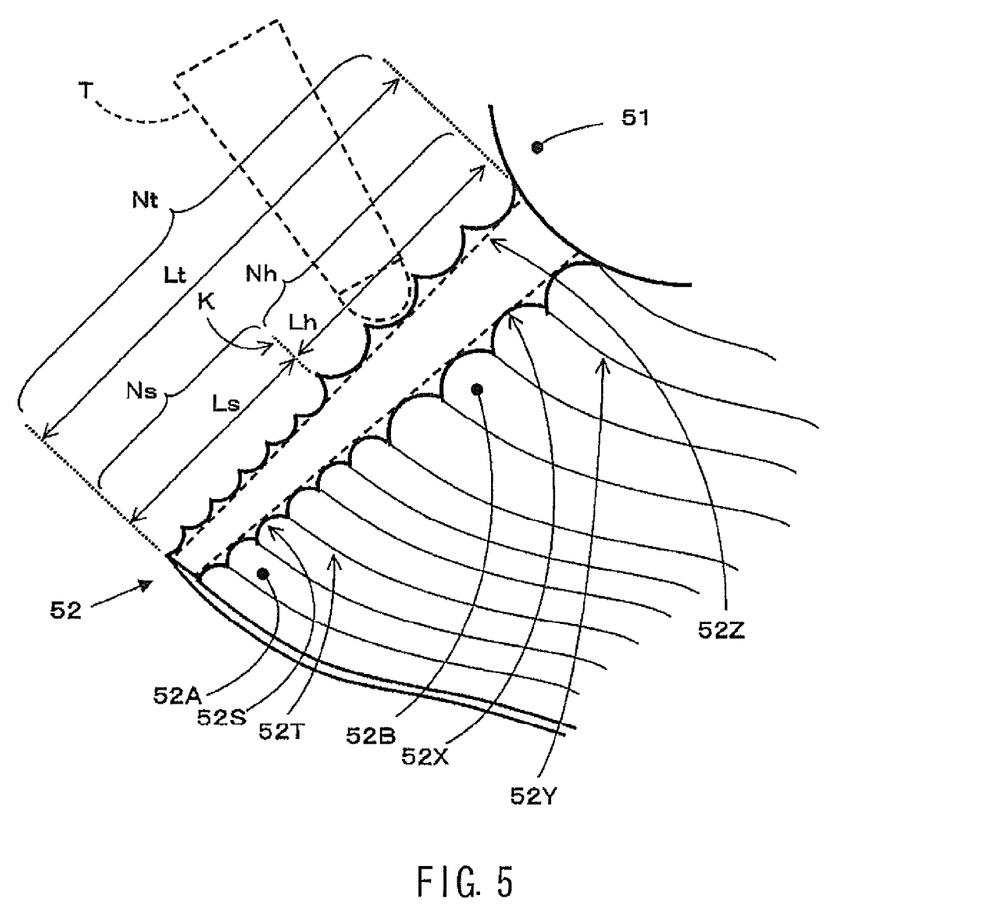
FIG. 5 is an enlarged view of a portion of the impeller showing the grooves in accordance with an embodiment of the present invention.

The grooves are machined as described above, where the path pitch of the grooves may be altered using a specific predetermined boundary position. The specific position (boundary position K) will be described with reference to FIG. 5. As shown in FIG. 5, the total number of paths Nt is the number of grooves from the position closest to the rotation axis ZC to the position farthest from the rotation axis ZC of the vane portion 52. The total number of paths Nt corresponds to the number of paths of the machining tool. The hub side number of paths Nh is the number of grooves from a position closest to the rotation axis ZC to the boundary position K of the vane portion 52. The shroud side number of paths Ns is the number of grooves from the position furthest from the rotation axis ZC to the boundary position K of the vane portion 52.

As shown in FIG. 5, the total length Lt is defined as the length from the position closest to the rotation axis ZC to the position farthest from the rotation axis ZC of the vane portion 52. The hub side length Lh is the length from the position closest to the rotation axis ZC to the boundary position K of the vane portion 52. The shroud side length Ls is defined as the length from the position farthest from the rotation axis ZC to the boundary position K of the vane portion 52. For example, the hub side number of paths Nh, the shroud side number of paths Ns, and the hub side length Lh may be set to satisfy both (formula 1) and (formula 2) to be discussed below. As a result, the exact position of the boundary position K may be determined. The hub side number of paths Nh, the shroud side number of paths Ns, and the total number of paths Nt are integers since they are numbers of grooves. The total number of paths Nt may be set to an integer in an appropriate range in accordance with the total length Lt.

$$1 \le Nh < Nt \times (Lh/Lt) \qquad \text{(formula 1)}$$

$$Ns \ge Nh \qquad \text{(formula 2)}$$

As described earlier, the impeller 50 is machined from a base material. The total amount of machining time may be reduced by machining the impeller with fewer grooves. The directions and heights of the grooves are made appropriate. This may suppress the pressure loss, in particular, the pressure loss at the intake inflow port 20A.

Now referring to FIG. 6, a turbo unit is shown with the turbocharger 1 in FIG. 1 with an inlet elbow 2. The inlet elbow 2 is attached with the turbocharger 1 to guide intake gas (i.e. air) to the intake inflow port 20A of the turbocharger 1.

As shown in FIG. 6, the compressor has the intake housing 20 and the impeller. An intake discharge port 2B of the inlet elbow 2 connects to the intake inflow port 20A of the turbocharger 1. The inlet elbow 2 is formed substantially as a tube having the intake inflow port 2A at one end of the tube and the intake discharge port 2B at the other end of the tube. The inlet elbow 2 is accommodated in the limited mounting space in the engine room of the engine, so that the inlet elbow 2 is curved in various directions. Thus, air flowing through the inlet elbow 2 may swirl therein in a predetermined direction.

Figure 7:
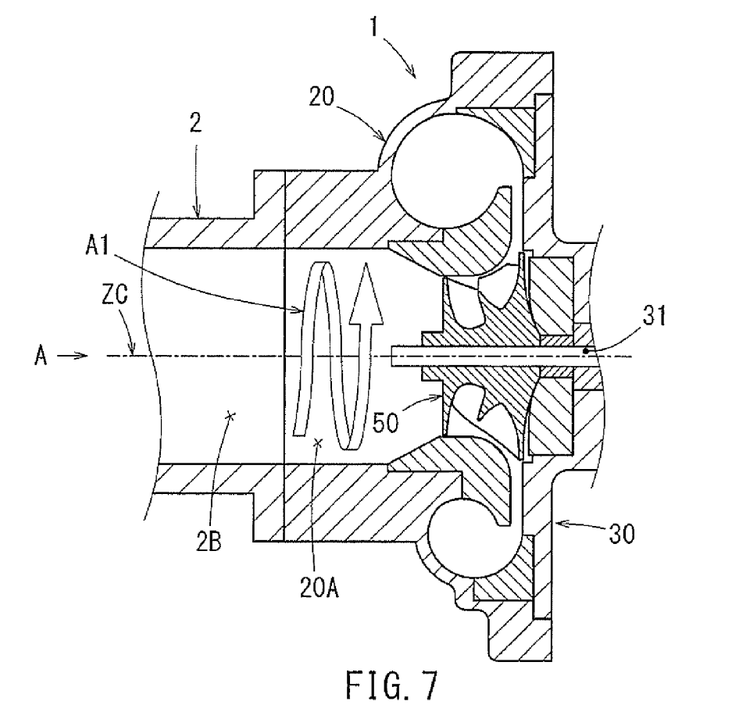
FIG. 7 is a cross-sectional view taken in the axial direction of the inlet elbow and an intake housing showing circulation of fluid entering the intake housing in accordance with an embodiment of the present invention.

As shown in FIG. 7, air A1 flowing into from the inlet elbow 2 may be swirled in a predetermined direction. The air A1 may swirl in a counterclockwise direction relative to direction A. The impeller 50 has a configuration as shown in FIGS. 2 and 3, and rotates in the clockwise direction. Thus, as shown in FIG. 7, the swirling direction of the air A1 is opposite to the rotational direction of the impeller 50. In such an instance, pressure loss may be larger than where the swirling direction of the air and the rotational direction of the impeller 50 are identical.

In order for the swirling direction of the air A1 in FIG. 7 to be the same as the rotational direction of the impeller 50, some contrivance in terms of the curved configuration of the inlet elbow 2 is needed. However, altering the mounting space of the vehicle may not be practical. Thus, altering the configuration of the inlet elbow 2 may not be practical. Accordingly, a fluid swirl-regulating portion (or a fluid swirl-regulating member) may be mounted to the vicinity of the intake discharge port 2B of the inlet elbow 2, or positioned in the vicinity of the intake inflow port 20A of the turbocharger 1. Thus, the swirl of the air A1 itself shown in FIG. 7 is regulated. The impeller 50, the intake housing 20, and the fluid swirl-regulating portion effectively suppress pressure loss.

Figure 8:
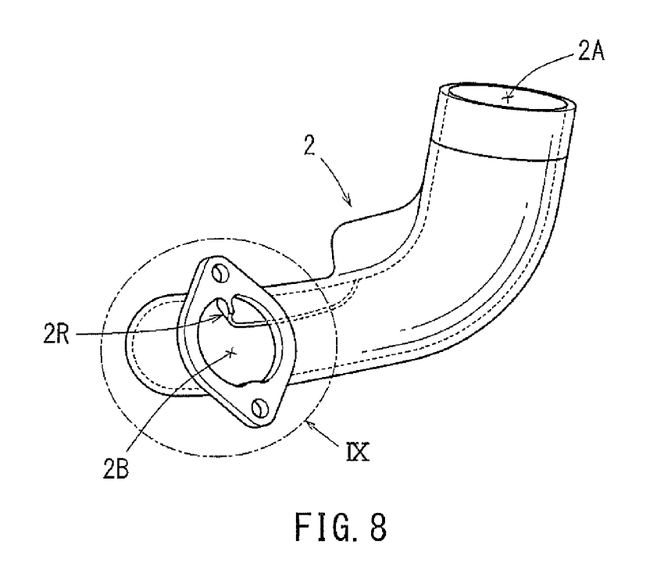
FIG. 8 is a perspective view of the inlet elbow with a discharge port for discharging an intake gas located at one end of the inlet elbow in accordance with an embodiment of the present invention.
Figure 9:
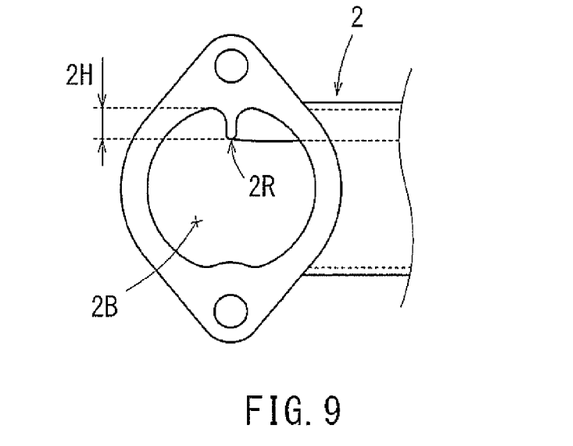
FIG. 9 is an enlarged view of a portion of FIG. 8.
Figure 10:
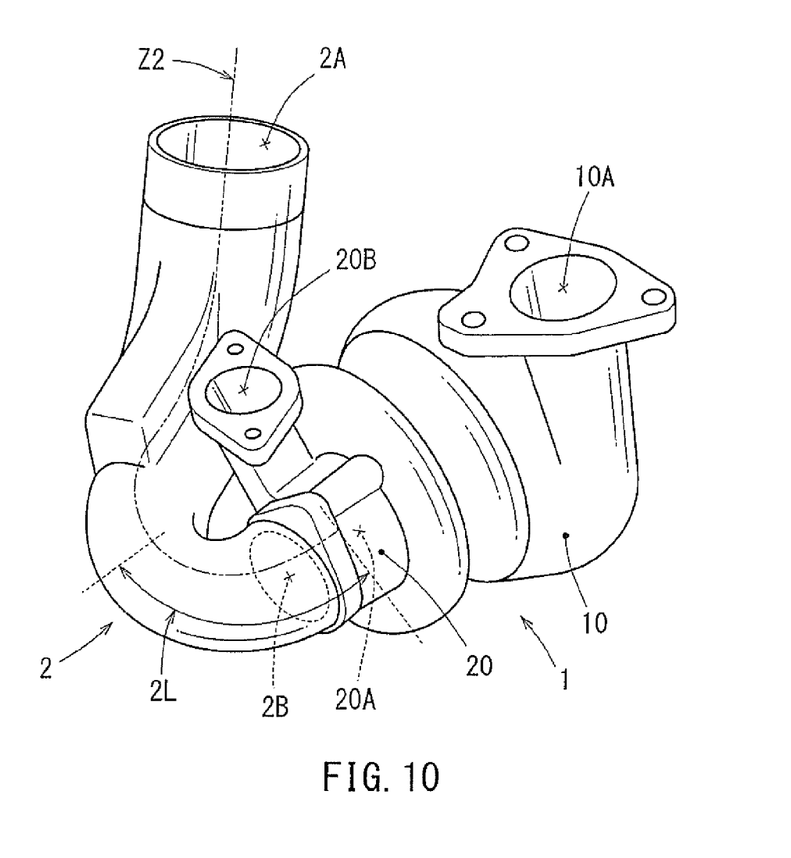
FIG. 10 is a perspective view of the turbo unit showing a fluid flow path in the inlet elbow in accordance with an embodiment of the present invention.

A fluid swirl-regulating portion 2R, as shown in FIGS. 8 and 9, may be formed as a rib, and is provided in the vicinity of the intake discharge port 2B of the inlet elbow 2. The fluid swirl-regulating portion 2R extends radially inwards from an inner surface of the inlet elbow 2. The fluid swirl-regulating portion 2R defines length in the longitudinal direction (axial direction) of the inlet elbow 2. The longitudinal length at least corresponds to 2L, as shown in FIG. 10. The fluid swirl-regulating portion 2R has a length defined as a distance at least from the intake discharge port 2B to a curved portion where a curvature of the curved configuration of the inlet elbow 2 is not less than a predetermined curvature. The fluid swirl-regulating portion 2R may suppress swirl of the inflow air around the inner surface of the inlet elbow 2. As a result, the pressure loss is suppressed.

Figure 11:
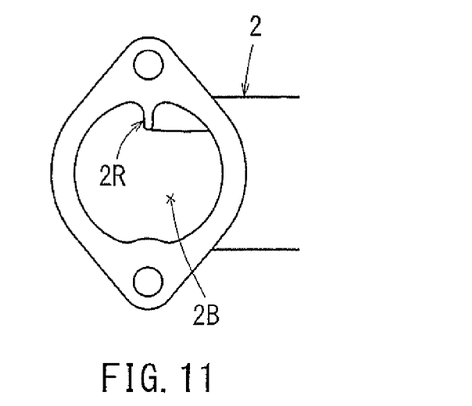
FIG. 11 is a perspective view of a fluid swirl-regulating portion positioned at the discharge port of the inlet elbow in accordance with an embodiment of the present invention.
Figure 12:
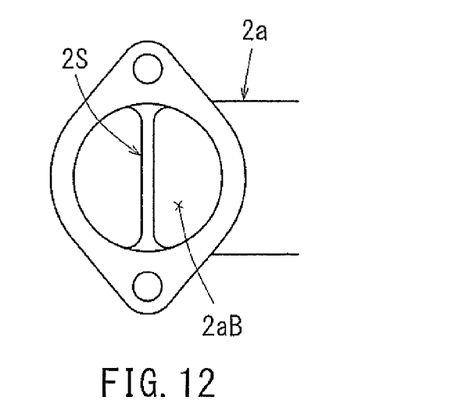
FIGS. 12-16 are various perspective views of fluid swirl-regulating portions and/or fluid swirl-regulating member in accordance with one or more embodiments of the present invention.
Figure 13:
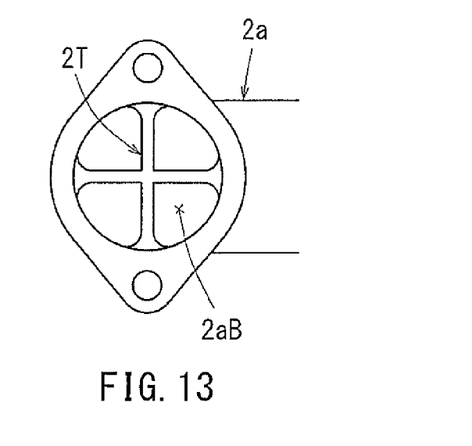

Fluid swirl-regulating portions in accordance with other configurations will be described with reference to FIGS. 11 through 16. The fluid swirl-regulating portion 2R shown in FIG. 11 is the fluid swirl-regulating portion shown in FIGS. 8 and 9, therefore an additional description thereof is omitted. The fluid swirl-regulating portion 2R and fluid swirl-regulating members 2S and 2T as shown in FIGS. 11 through 13 may be situated in the vicinity of the intake discharge port 20A of the inlet elbow 2. The fluid swirl-regulating portion 20R and the fluid swirl-regulating members 20S and 20T may be situated in the vicinity of the intake inflow port 20A of the intake housing 20a, and/or the intake inflow port 20A of the intake housing 20.

The fluid swirl-regulating member 2S shown in FIG. 12 may be a member separate from the inlet elbow 2a. The fluid swirl-regulating member 2S may be formed as a plate that extends lengthwise along the longitudinal direction of the inlet elbow 2a. The fluid swirl-regulating member 2S extends in the radial direction, and thus bridges between portions of the inner surface of the inlet elbow 2a. Inside the inlet elbow 2a, the fluid swirl-regulating member 2S defines length in the longitudinal direction of the inlet elbow 2a. The fluid swirl-regulating member 2S extends length-wise along an axis Z2, defined at a center of a flow path through the inlet elbow as shown in FIG. 10. As shown in FIG. 10, the longitudinal length of the fluid swirl-regulating member 2S may be 2L. The fluid swirl member 2S has edges in contact with the inner surfaces of the inlet elbow 2a. Such edges may be thicker in width than the other portion of the fluid swirl-regulating member 2S. The edges may be generally arc-shaped to conform to the shape of an inner surface of the inlet elbow 2a, and assist in the arrangement in a stable manner inside the inlet elbow 2a.

Referring to FIG. 13, the fluid swirl-regulating member 2T has plates constructed in a cross-like fashion. The fluid swirl-regulating member 2T may be formed as a member separate from the inlet elbow 2a, and extend length-wise along the longitudinal direction (axial direction) of the inlet elbow 2a. The fluid swirl-regulating member 2T extends in the radial direction to bridge between portions of the inner surface of the inlet elbow 2a. The fluid swirl-regulating member 2T defines a length in the length-wise direction of the inlet elbow 2a. As shown in FIG. 10, the longitudinal length may be 2L. The fluid swirl-regulating member 2T has edges in contact with the inner surface of the inlet elbow 2a. The edges are thicker in width than the other portions of the fluid swirl-regulating member 2T. The edges may be generally arc-shaped to conform to the shape of an inner surface of the inlet elbow 2a, and assist in the arrangement in a stable manner inside the inlet elbow 2a.

As shown in FIGS. 11 through 13, the inlet elbow 2, 2a may include the fluid swirl-regulating portion 2R or the fluid swirl-regulating member 2S, 2T. The pressure loss of the fluid can be further suppressed by mounting the inlet elbow 2, 2a to the turbocharger.

Figure 14:
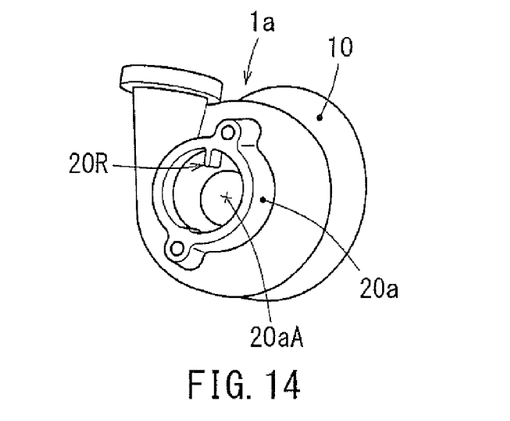

Referring now to FIG. 14, the fluid swirl-regulating portion 20R may be situated near the intake inflow port 20A of the intake housing 20a. The fluid swirl-regulating portion 20R may be in the form of a rib protruding radially inwards from an inner surface of the intake inflow port 20A. The fluid swirl-regulating portion 20R may have a length along a rotation axis direction within the intake inflow port 20A. The length is set to an appropriate length from the inlet side end of the intake inflow port 20A to a position where it avoids interference with the impeller 50.

Figure 15:
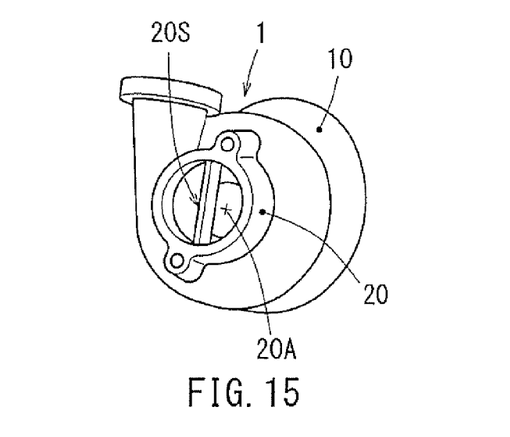

Referring now to FIG. 15, the fluid swirl-regulating member 20S may be formed as a member separate from the intake housing. The fluid swirl-regulating member 20S may be formed as a plate that extends along a rotation axis inside the intake inflow port 20A. The fluid swirl-regulating member 20S may extend in the radial direction to bridge between portions of the inner surface of the intake inflow port 20A. The fluid swirl-regulating member 20S has a length along the rotation axis within the intake inflow port 20A. The length may set to an appropriate length from the input side end of the intake inflow port 20A to a position where it avoids interference with the impeller 50. The fluid swirl-regulating member 20S has edges in contact with the inner surface of the intake inflow port 20A. The edges may be thicker than the other portion of the fluid swirl-regulating member 20S. The edges may be generally arc-shaped to conform with the intake inflow port 20A, and allow stable arrangement inside the intake inflow port 20A.

Figure 16:
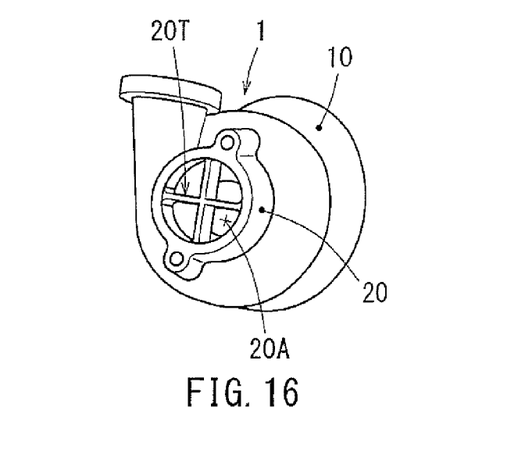

The fluid swirl-regulating member 20T shown in FIG. 16 may be formed as a member separate from the intake housing, and may have plates constructed in a cross-like fashion. The fluid swirl-regulating member 20T may extend in the radial direction to bridge between portions of inner surface of the intake inflow port 20A. The fluid swirl-regulating member 20T may extend along the rotation axis direction within the intake inflow port 20A. The length may be set to an appropriate length from the input side end of the intake inflow port 20A to a position where it avoids interference with the impeller 50. The fluid swirl-regulating member 20T has edges in contact with the inner surface of the intake inflow port 20A. The edges are thicker in width than the other portions of the fluid swirl-regulating member 20T. The edges are generally arc-shaped to conform to the inner surface of the intake inflow port 20A, and allow for stable arrangement inside the intake inflow port 20A.

As shown in FIGS. 14 through 16, the turbocharger has the fluid swirl-regulating portion 20R or the fluid swirl-regulating member 20S, 20T. As a result, the pressure loss of the fluid can be further suppressed.

The fluid swirl-regulating portion or the fluid swirl-regulating member shown in FIGS. 11 through 13 rectifies the outer peripheral portion of the air sucked-in in the vicinity of the intake discharge port of the inlet elbow. This helps to suppress the pressure loss of the fluid. The fluid swirl-regulating portion or the fluid swirl-regulating member shown in FIGS. 14 through 16 rectifies the outer peripheral portion of the air sucked-in in the vicinity of the intake inflow port of the intake housing. This helps to suppress the pressure loss of the fluid.

Grooves are formed on the surfaces of the vane portions 52 and 53. The grooves may set to an appropriate direction and an appropriate height. This helps to suitably suppress the pressure loss.

As shown in FIGS. 3 and 5, the turbocharger impeller 50 is machined from a base material. The vane portions 52 and 53 may be formed with a machining tool T with grooves of an appropriate direction and height. As a result, producing the impeller 50 allows for shorter production time comparing to precision investment casting.

A fluid swirl-regulating portion may be further added to the turbocharger 1. The fluid swirl-regulating portion may be positioned near the intake inflow port of the compressor (intake housing) or in the vicinity of the intake discharge port of the inlet elbow. This helps to further suppress the pressure loss.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. Embodiments of the present invention should not be limited to the representative configurations, but may be modified, for example, as described below.

As shown in FIGS. 12 and 13, the fluid swirl-regulating member 2S, 2T may be formed as a member separate from the inlet elbow 2 or may be formed integrally with the inlet elbow 2. In the case where it is a member separate from the inlet elbow 2, the fluid swirl-regulating member may be fixed to the inlet elbow 2 by a bolt or the like, if necessary.

As shown in FIGS. 15 and 16, the fluid swirl-regulating member 20S, 20T may be formed as a member separate from the intake housing 20 or may be formed integrally with the intake housing 20. In the case where it is a member separate from the intake housing 20, the fluid swirl-regulating member may be fixed to the intake housing 20 by a bolt or the like, if necessary.

As shown in FIG. 11, the fluid swirl-regulating portion 2R may be formed integrally with the inlet elbow 2, or may be a member separate from the inlet elbow 2. In the case where it is a member separate from the inlet elbow 2, the fluid swirl-regulating portion 2R may be fixed to the inlet elbow by a bolt or the like, if necessary.

As shown in FIG. 14, the fluid swirl-regulating portion 20R may be formed integrally with the intake housing, or may be formed as a member separate from the intake housing. In the case where it is a member separate from the intake housing, the fluid swirl-regulating portion 20R may be fixed to the intake housing by a bolt or the like, if necessary.

The above-described embodiments are not restricted to a vehicle with an internal combustion engine mounted therein, but may also applicable to various other uses.

As described above, the path pitches P1 and P2 of the grooves may be different at the boundary position. Alternatively, the path pitches P1 and P2 of the grooves may be set to be gradually decreased with distance from the rotation axis ZC, specifically with distance from the side near the rotation axis ZC.

The expressions: "not less than ($\geq$)," "not more than ($\leq$)," "more than ($>$)," "less than ($<$)," etc. may or may not include an equal sign. The values adopted in the description of the present embodiment are only given by way of example, and should not be construed restrictively.

The invention claimed is:

1. A turbocharger compressor impeller comprising:
a hub portion shaped as a truncated cone that gradually increases in diameter along a rotation axis;
a plurality of vane portions formed on a surface of the hub portion wherein the plurality of vane portions are configured to receive a fluid flowing along the rotation axis and to force-feed the fluid in a radially outward direction;
a plurality of grooves formed on outer surfaces of the plurality of vane portions, wherein the plurality of grooves extend in the radially outward direction in which the fluid flows during impeller rotation; and
a plurality of crest portions formed between adjacent grooves of the plurality of grooves to protrude outwardly from two of the adjacent grooves of the plurality of grooves and to extend along a longitudinal direction of the plurality of grooves wherein a height of each of the plurality of crest portions in a central region near the rotation axis are relatively higher than a height of each of the plurality of crest portions in an outer region further away from the rotation axis,
wherein a width of a gap between the plurality of grooves in the outer region is less than a width of a gap between the plurality of grooves in the central region.

2. A method of manufacturing the turbocharger compressor impeller according to claim 1, comprising the steps of:
machining the plurality of vane portions from a base material by guiding a machining tool along an outward direction in which the fluid flows during impeller rotation; and
forming the plurality of grooves on the outer surfaces of the plurality of vane portions by machining the plurality of vane portions wherein the plurality of grooves are formed such that edges of the adjacent grooves face each other and further wherein the plurality of grooves are formed with the crest portions in between the adjacent grooves in the outer region lower in height than the crest portions in between the adjacent grooves in the central region.

3. A turbocharger comprising:
a compressor including;
a housing configured to accommodate the turbocharger compressor impeller according to claim 1, and
a fluid swirl-regulating portion formed in a vicinity of an inflow port of the compressor, wherein the fluid swirl-regulating portion regulates swirling of the fluid along an inner surface of the compressor,
wherein the fluid swirl-regulating, portion comprises a rib or a plate.

4. The turbocharger according to claim 3,
wherein the fluid swirl-regulating portion extends radially inwards from the inner surface of the compressor, and further wherein the fluid swirl-regulating portion is the rib extending along the rotation axis.

5. The turbocharger according to claim 3, wherein the fluid swirl-regulating portion extends in a radial direction to connect opposing portions of the inner surface of the compressor, and
further wherein the fluid swirl-regulating portion is the plate extending along the rotation axis.

6. The turbocharger according to claim 3, wherein the fluid swirl-regulating portion is a separate non-integrally formed component from the inner surface of the compressor and attaches to the inner surface of the compressor.

7. A turbocharger unit comprising:
a compressor with a housing configured to accommodate the turbocharger compressor impeller according to claim 1;
an inlet elbow shaped as a pipe in fluid communication with the compressor to flow the fluid in the compressor along the rotation axis of the turbocharger compressor impeller; and
a fluid swirl-regulating portion formed in a vicinity of an inflow port of the compressor, wherein the fluid swirl-regulating portion regulates swirling of the fluid along an inner surface of the inlet elbow, wherein the fluid swirl-regulating portion comprises a rib or a plate.

8. The turbocharger unit of claim 7, wherein the fluid swirl-regulating portion extends radially inwards from the inner surface of the inlet elbow; and
further wherein the fluid swirl-regulating portion is the rib that extends along the inlet elbow.

9. The turbocharger unit of claim 7, wherein the fluid swirl-regulating portion extends in a radial direction to connect opposing portions of the inner surface of the inlet elbow; and
further wherein the fluid swirl-regulating portion has the plate that extends along the inlet elbow.

10. The turbocharger unit of claim 7, wherein the fluid swirl-regulating portion is separate from the inner surface of the inlet elbow and attaches to the inner surface of the inlet elbow.

11. A turbocharger compressor impeller comprising:
a hub portion shaped as a truncated cone that gradually increases in diameter along a rotation axis orthogonal to the hub portion wherein the rotation axis intersects a center of the hub portion;
a plurality of vane portions formed on a surface of the hub portion wherein the plurality of vane portions are configured to receive a fluid flowing toward the hub portion to redirect the fluid radially outward relative to the hub portion;
a plurality of grooves formed on outer surfaces of the plurality of vane portions, wherein the plurality of grooves extend in a direction along which the fluid flows during impeller rotation; and
a plurality of crest portions formed between adjacent grooves of the plurality of grooves to protrude outwardly from two of the adjacent grooves of the plurality of grooves and to extend along a longitudinal direction of the plurality of grooves wherein a height of each of the plurality of crest portions in a central region near the rotation axis are relatively higher than a height of each of the plurality of crest portions in an outer region further away from the rotation axis,
wherein a width of a gap between the plurality of grooves in the outer region is less than a width of a gap between the plurality of grooves in the central region.

12. A turbocharger comprising:
a compressor including;
a housing configured to accommodate the turbocharger compressor impeller of claim 11;
an inflow port in fluid communication with the housing, and a fluid swirl-regulating portion associated with the inflow port configured to receive the fluid wherein the fluid swirl-regulating portion regulates swirling of the fluid along an inner surface of the compressor to suppress pressure loss of the fluid moving across the turbocharger compressor impeller, wherein the fluid swirl-regulating portion comprises a rib or a plate.

13. The turbocharger according to claim 12, wherein the fluid swirl-regulating portion extends radially inwards from an inner surface of the housing.

14. The turbocharger according to claim 12, wherein the fluid swirl-regulating portion extends in a radial direction to connect opposing portions of an inner surface of the housing.

* * * * *